United States Patent [19]

Haskins

[11] 3,898,546

[45] Aug. 5, 1975

[54] SOLID STATE SYNCHRONIZER SYSTEM WHICH USES THE ZERO CROSSING POINT OF A SYNCRO OUTPUT AS A REFERENCE

[75] Inventor: Delbert E. Haskins, Irving, Tex.

[73] Assignee: Textron Inc., Providence, R.I.

[22] Filed: May 10, 1974

[21] Appl. No.: 468,896

[52] U.S. Cl. .................. 318/591; 318/648; 318/654
[51] Int. Cl. ..... B64c 17/06; G05b 7/00; H03b 3/06; H03d 13/00
[58] Field of Search ............. 328/72, 133, 134, 151; 235/150.25, 150.26, 150.27; 340/347 SY; 244/3.2

[56] References Cited
UNITED STATES PATENTS

| | | | |
|---|---|---|---|
| 3,510,867 | 2/1966 | Sliwa............................ | 340/347 SY |
| 3,629,711 | 12/1971 | Stole et al......................... | 328/133 |
| 3,639,850 | 2/1972 | Brooks.............................. | 328/133 |

*Primary Examiner*—Robert K. Schaefer
*Assistant Examiner*—John J. Feldhaus
*Attorney, Agent, or Firm*—Richards, Harris & Medlock

[57] ABSTRACT

A synchronizer system where a positioned synchro transmitter has a rotor excited from an a.c. source and a demodulator operating by momentarily sampling the output of the transmitter once every $n$ cycles of the voltage from the a.c. source where $n$ is greater than 1. An integrator is responsive to the pulsed output of the demodulator with a feedback network responsive to the integrator for controlling the instant of sampling the output to null the output voltage. The integrator may be latched at any phase angle thereafter to cause production of an error signal from the demodulator proportional to further relative rotation in the transmitter.

15 Claims, 3 Drawing Figures

SOLID STATE SYNCHRONIZER SYSTEM WHICH USES THE ZERO CROSSING POINT OF A SYNCRO OUTPUT AS A REFERENCE

This invention relates to a rotational reference system, and more particularly to a simplified continuous rotational synchronizer system. In a more specific aspect, the invention relates to aircraft guidance in which a voltage is stored to represent phase of reference element which element may be rotated through many cycles.

In control of aircraft in flight, a gyro controlled element is employed with a suitable pickoff arrangement which permits the development of an error signal when the attitude of the aircraft relative to a given axis changes from a preset attitude. A control system then normally is employed in response to the error signal to correct the attitude of the aircraft, i.e., guide it back to the reference attitude. Such systems are used in airplanes on the pitch, roll and yaw axis and in some installations it can also be used in the altitude channel. Currently, aircraft automatic flight control systems employ electromechanical units to accomplish the necessary synchronization function.

Synchronization in aircraft guidance systems in one sense has been understood to refer to the automatic tracking by a rotor of a synchro receiver unit of the rotational motion of an associated synchro transmitter unit. When a rotor of a receiver synchro is locked, as is done to command a given aircraft heading for example, any deviation in heading will thereafter appear as an error signal that is utilized in the aircraft guidance system to correct heading. It will be appreciated that aircraft may operate under manual control, before locking the receiver synhcro rotor through turns that extend more than 360° in azimuth. Synchronizer units have been electromechanical in form as well as in solid state form. In the latter form, the synchronizers have no rotor and have been limited in range to less than 90° of rotation.

In contrast with prior art systems, the present invention is directed to a solid state synchronizer that does not have the limitation as to range but rather operates continuously through more than 360°. At the same time applicant's synchronizer is more reliable and can be provided at lower cost than the prior art electromechanical synchronizers.

The present invention requires only a single control transducer connected for a reference system.

In accordance with the invention, a synchronizer is responsive to a control transducer having a rotor and a multiphase stator wherein the stator is excited with a mutliphase voltage of given frequency to produce a single phase output voltage at the given frequency. The output voltage is continuously variable in phase in response to rotation of the stator relative to the rotor which normally would be under gyro control. A control means then is provided automatically responsive to a reference derived from the three phase excitation voltage to sample the output voltage at its zero axis crossing to provide a synchronized signal. Selector means are then provided to lock the phase at which the output of the rotor is sampled. A feedback system controls the aircraft attitude on the selected axis to maintain the zero crossing at the selected phase.

In a further aspect, control means are provided automatically to track the zero crossing of the output voltage as the relative position between stator and rotor changes to provide at a system output terminal a synchronized signal by tracking the zero crossing. Means are then provided to latch the control means to arrest further tracking of the zero crossing and to cause development of an error signal proportional to further rotation of the rotor relative to the stator.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1

Figure 1:
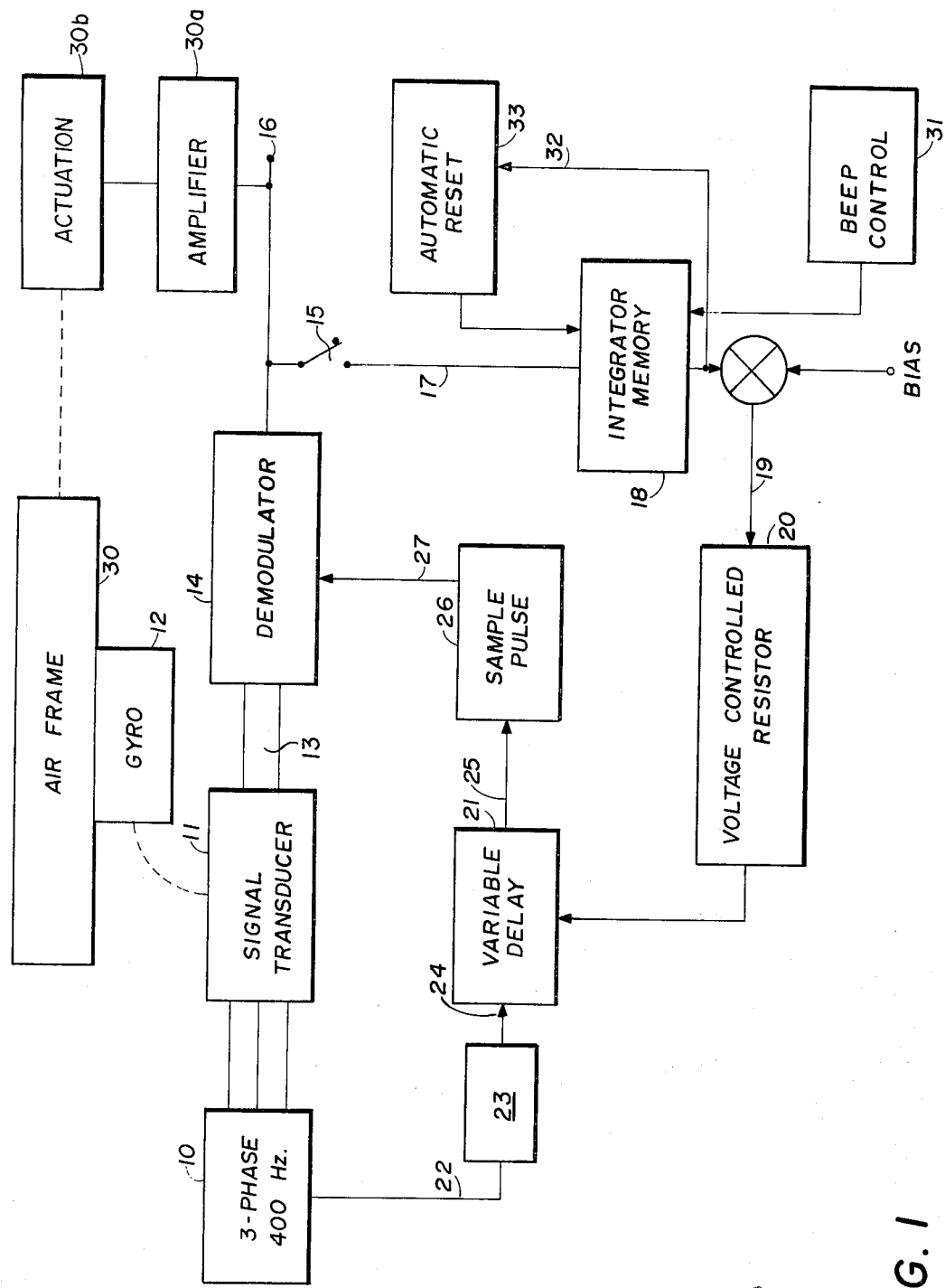
FIG. 1 is a block diagram illustrating one embodiment of the invention.

FIG. 1 illustrates in block diagram a system embodying the present invention. The purpose of the invention is to provide a simplified more reliable indication of rotational motion relative to a reference. The invention further provides for the selection of the reference position within the rotational system and accommodates rotation of 360° or more.

In this embodiment, a three phase 400 Hz source 10 is connected to a signal transducer 11 generally known as a synchro transmitter. Tranducer 11 comprises three phase stator windings which are fixed in position and cooperate with a rotor which is characterized by a single phase winding as will be shown in FIG. 2. The rotor normally would be connected to a gyroscope as a part of a guidance system for aircraft. The stator windings would be fixed to the airframe. As the gyro 12 positions the rotor in transducer 11, a voltage of 400 Hz frequency appears on the output channel 13. The output voltage is continuously variable in phase as it tracks the relative motion between stator and rotor.

The output voltage is applied to a 400 cycle phase demodulator 14. The output of the demodulator 14 is connected to an output terminal 16. It is also connected by way of a switch 15 and channel 17 to an integrator memory 18. Integrator memory 18 develops a control voltage on a line 19 which controls the effective resistance of a unit 20. A resistor in unit 20 then controls the period of a variable delay unit 21. A reference voltage at 400 cycles on line 22 is applied by way of a frequency divider 23 to the variable delay unit 21. The divider 23 is a divide by two unit so that the signal applied on line 24 to delay unit 21 is at 200 cycles or of twice the period.

The output of the variable delay unit 21 is applied by way of line 25 to a sample pulse generator 26. Generator 26 is connected to the phase demodulator 14 by way of line 27.

The purpose of the system thus far described is to synchronize the output signal appearing at the output of demodulator 14 to maintain it at zero phase until the switch 15 is opened. Essentially, integrator 18 and resistor unit 20 control the variable delay unit 21 so that the output appearing on channel 13 is sampled at the zero axis crossing of the output of transducer 11 so that the voltage on line 17 is maintained at zero or null during the synchronizing operation.

Switch 15 may be opened at any instant as by a pilot on an aircraft. Thereafter, an error signal will be developed at terminal 16 which is dependent upon and proportional to the amount of rotation between the positioned gyro 12 on the stator in unit 11 as it moves with an airframe 30. Prior to opening switch 15, because of the operation of the variable delay device, the rotor in unit 11 may rotate, without limitation through more than 360° or more. The output signal on line 17 is null or zero at all times that switch 15 is conductive.

Any output signal appearing at terminal 16 after switch 15 is opened may be applied in a conventional manner through amplifier 30a and actuator 30b to the airframe 30 so that the control loop maintains the voltage at terminal 16 at a null. Thus, airframe 30 is stabilized at the heading which existed at the instant switch 15 was opened.

As will further be explained, the pilot may selectively control attitude through a unit 31. Unit 31 responds to a manual input to apply a signal to the integrator memory 18 to change attitude as desired.

The output of the integrator 18 is connected by way of channel 32 to an automatic reset unit 33. Unit 33 serves to reset the integrator memory unit 18, i.e., reset its reference voltage back to zero, when output voltage from unit 18 reaches a level which is representative of a delay in unit 21 approaching zero or 720° of the 400 cycle excitation voltage. When the integrator memory is thus reset, it locks on to a different zero crossing point. The system operates in either of two modes, (1) a synchronize mode (switch 15 closed or conductive) and (2) an engage mode (switch 15 open or nonconductive).

FIG. 2

Figure 2:
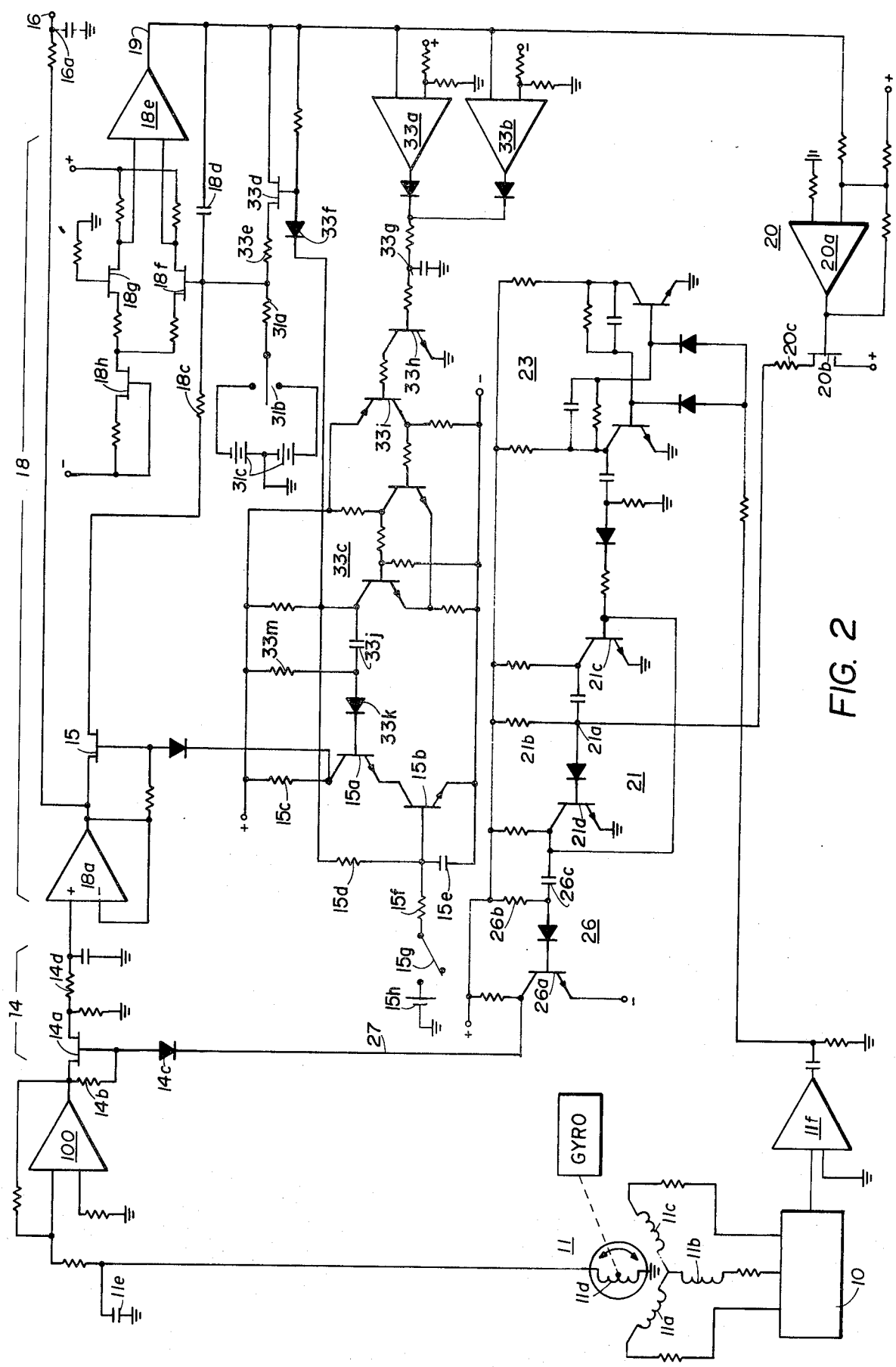
FIG. 2 is a detailed circuit diagram of one embodiment of the invention.

The system described in block form in FIG. 1 is shown in detail in FIG. 2.

Three phase power supply 10 is connected at the three outputs to the windings 11a, 11b and 11c of the control transducer 11. The windings 11a, 11b and 11c are connected in a Y configuration. The rotor 11d has one terminal connected to ground and has a capacitor 11e connected in parallel therewith. The output of the rotor 11d is connected by way of an isolation amplifier 100 to demodulator 14. Demodulator 14 comprises a field effect transistor 14a with a resistor 14b connected across the transistor input. The gate of transistor 14a is connected by way of a diode 14c to the output of sample pulse unit 26. The output of the gate 14a is connected by resistor 14d and a shunt capacitor 14e to the input of integrator memory 18.

Memory 18 comprises an isolation amplifier 18a the output of which is connected through an FET switch 15 and a resistor 18c to one terminal of a capacitor 18d. So long as switch 15 is closed, capacitor 18d serves to store a charge proportional to the magnitude of the output of amplifier 100 at the instant gate 14a conducts.

Capacitor 18d and resistor 18c are the basic elements of an integrator in which the charge on condenser 18d is the time integral of the voltage output pulses from amplifier 18a.

The output of amplifier 18a is also connected by way of a smoothing circuit 16a to output terminal 16 and is employed when in the engage mode.

The voltage across capacitor 18d is applied to an amplifier 18e through FETs 18f and 18g which are provided to minimize drift in amplifier 18e. The circuit of the FET 18h serves as a constant current source for FETs 18f and 18g as they operate in drift compensation to stabilize the operation of the amplifier 18e.

The ouptut of memory 18 is connected by way of line 19 to the input of voltage controlled resistor circuit 20. Circuit 20 has an input amplifier 20a, the output of which controls an FET 20b. Amplifier 20a controls the effective resistance appearing across the terminals of the FET 20b. The resistance of FET 20b can be varied from zero to infinity depending upon the voltage output from amplifier 20a.

FET 20b is connected through a small resistor 20c to a terminal 21a in variable delay generator 21. The effective resistance of the FET 20b is connected in parallel with resistance 21b.

Delay generator 21 will be recognized as comprising a one-shot mutlivibrator the period of which is controlled by the combined magnitudes of resistors 20c and 21b and the resistance of FET 20b. In the configuration shown, the range of the period of multivibrator 21 is selected to extend from about 1 millisecond when FET 20b is short circuited to about 4 milliseconds when the resistance of FET 20b is infinity. This range is compatible with the period of the 400 cycle excitation voltage from source 10. It may be altered for use in connection with other excitation frequencies.

The delay generator 21 is connected at the base of transistor 21c to the output of a frequency divider circuit 23. From the 400 Hz output of isolation amplifier 11f, divider 23 produces 200 Hz output which turns on the multivibrator of delay circuit 23 every 5 milliseconds. The period that circuit 21 remains on is controlled by the voltage across condenser 18d acting through circuit 20.

The output of the delay unit 21 is applied to a sample pulse generator 26. Unit 26 is in effect a simplified one-shot multivibrator. When the collector of transistor 21d goes down, i.e., when transistor 21d begins to conduct, the voltage at the collector of transistor 26a goes high producing a positive going pulse on line 27 which is applied to the FET 14a. During the period that line 27 is high, the FET switch 14a effectively conducts to apply through amplifier 18a, FET 15 and resistance 18c an additional charge to the capacitor 18d. The length of the sample pulse is determined by the time constant of the network comprising resistor 26b and capacitor 26c. Normally, in practice this sample interval is of the order of 300 microseconds in width.

From the foregoing description it will be seen that as long as the FET 15 is conductive, the system operates in the synchronizing mode to track the zero crossing of the output voltage from the rotor 11d. The control system automatically responds to sample the output of the rotor 10 to provide synchronization.

If the voltage output from the demodulator 14 is other than zero, then the charge on capacitor 18d is either increased or decreased, depending upon the sign of the output voltage from the demodulator. The change is such that the position in time of the sample pulse on line 27 is changed to minimize or null the voltage output from the demodulator 14.

Capacitor 18d is connected to a discharge circuit which includes FET 33d and a small protective resistor 33e. The gate of FET 33d is connected by a diode 33f to the collector of the output stage of a Schmitt trigger circuit 33c. The Schmitt trigger circuit 33c is controlled by outputs from differential amplifiers 33a and 33b. Amplifiers 33a and 33b are connected at one input each to the output line 19. The second input terminal of amplifier 33a is connected to a positive reference source. The second terminal of amplifier 33b is connected to a negative reference source. The outputs are connected through diodes to a common terminal leading to a delay circuit 33g. The output of the delay circuit 33g is connected through transistors 33h and 33i to the input of the Schmitt trigger 33c.

The collector of the output stage of the circuit 33c is connected through a capacitor 33j and a diode 33k to the base of a transistor 15a. The collector of transistor 15a is connected to the gate of the switch FET 15. The emitter of transistor 15a is connected to the collector of a transistor 15b, the emitter of which is connected to a negative voltage source. The collector of transistor 15a is connected by way of resistor 15c to a positive voltage source. The juncture between capacitor 33j and diode 33k is connected to the positive voltage source by way of a resistor 33m. The collector of the output of the Schmitt trigger 33c is connected by way of resistor 15d to the base of transistor 15b. A capacitor 15e connects the base of transistor 15b to its emitter. The base of transistor 15b is also connected by way of a resistor 15f to a switch 15g. The switch 15g is connected to a positive terminal of a battery 15h, the negative terminal of which is connected to ground.

The juncture between resistor 18c and capacitor 18d is connected by way of a charging resistor 31a to a switch 31b. Batteries 31c are connected to switch 31b so that the switch 31b may be closed in either direction to add charge to or drain charge from capacitor 18d.

OPERATION

Operation in the synchronization mode involves the repeated sampling by a pulse on line 27 of the output of amplifier 100. If the voltage sampled is not zero, switch 15 being closed, a charge is stored on capacitor 18d. The output of amplifier 18e is then applied through amplifier 20 to control the resistance of FET 20b. This controls the period of the multivibrator 21. The circuit is a negative feedback circuit so that the instant at which the sample pulse from the sample network 26 appears, it is adjusted to a point that the voltage out of amplifier 18a becomes zero. In other words, the sample pulse on line 27 is controlled to occur at the instant of the zero crossing of the output voltage from rotor 11d. It will be recognized that the charge placed on capacitor 18d may be either positive or negative, depending on the polarity of the output voltage from amplifier 100 when the pulse on line 27 is not exactly at the zero crossing. During synchronization if the rotor 11d continues to turn relative to the stator, the charge on capacitor 18d will continue to build either in the positive or negative direction. This continues until the voltage on line 19 is either more positive than the reference voltage on amplifier 33a or more negative than the reference voltage on amplifier 33b. When either of the foregoing conditions occur, the output from the amplifiers 33a or 33b is applied to trigger the Schmitt trigger 33c. When the output stage of trigger 33c is rendered nonconductive, its collector goes high approaching the positive voltage source. This closes the switch 33d abruptly to discharge capacitor 18d through resistor 33e. At the same time, the positive voltage from the collector of the trigger 33c is applied by way of resistor 15d to the base of transistor 15b. This causes transistor 15b to become conductive. This lowers the voltage on the collector of transistor 15a so that the voltage at the gate of switch 15 is lowered and switch 15 becomes immediately nonconductive, thereby avoiding any recharge of capacitor 18d while it is being discharged. Capacitor 15e holds transistor 15b conductive for a short period after trigger 33c returns to its normal state. Immediately, the gate 15 is again closed and capacitor 18d then becomes charged to a different voltage represented by the different output of the demodulator 14.

Upon reset, the trailing edge of the Schmitt trigger pulse is effective through transistor 15a to apply a sample pulse to the FET 15. The period transistor 15a is cut off is controlled by resistor 33m and capacitor 33j and preferably is on the order of 5 milliseconds. This reestablishes the synchronization but at a pulse length from the variable delay unit 21 to a substantially different period, differing by an amount within the range of from 1 millisecond to 4 milliseconds. As a result, rotor 11 may turn through many complete revolutions with reset unit 33 intermittently resetting and locking onto a zero crossing which is at a phase angle relative to the excitation of stator 11a–11c close to zero and less than 360°.

Since the frequency divider 23 reduces the demodulator reference frequency by a factor of two, the time interval over which the period of the delay unit 21 can be adjusted actually represents about 720° so that there will be a null point at some intermediate voltage on capacitor 18d. It is to this intermediate voltage that the capacitor 18d is recharged following closure of switch 15 after discharge. Thus, as the rotor 11d continues to rotate, the capacitor 18d will be repeatedly discharged and will then again be recharged so that the system during synchronization tracks the zero crossing of the output voltage from the rotor 11d.

The system is then capable of being locked in the engage mode by closure of switch 15g. This applies a positive voltage to the base of transistor 15b which rendered transistor 15b conductive thereby lowering the voltage on the gate of switch 15. So long as switch 15g is closed, switch 15 is open and the charge on capacitor 18d will not be changed by any error signal at the output of amplifier 18a.

It will be noted, however, that in the engage mode, the charge on capacitor 18d may be changed by actuation of switch 31b. It will be understood that the switch 31b may be operated in a given direction a sufficient number of times or for such period that the charge on capacitor 18d will cause the voltage on line 19 to exceed one or the other of the reference voltages on amplifiers 33a or 33b. In such case, the capacitor 18d will be discharged by operation of the trigger circuit 33c. By this means, the error signal from amplifier 18a as appearing at terminal 16 may be manually controlled. When used in the heading control channel of an autopilot, switch 31b permits the pilot to control heading at will. Switch 15g permits the pilot to lock the aircraft onto a given heading, i.e., the heading of the aircraft at the instant switch 15g is closed.

FIG. 3

Figure 3:
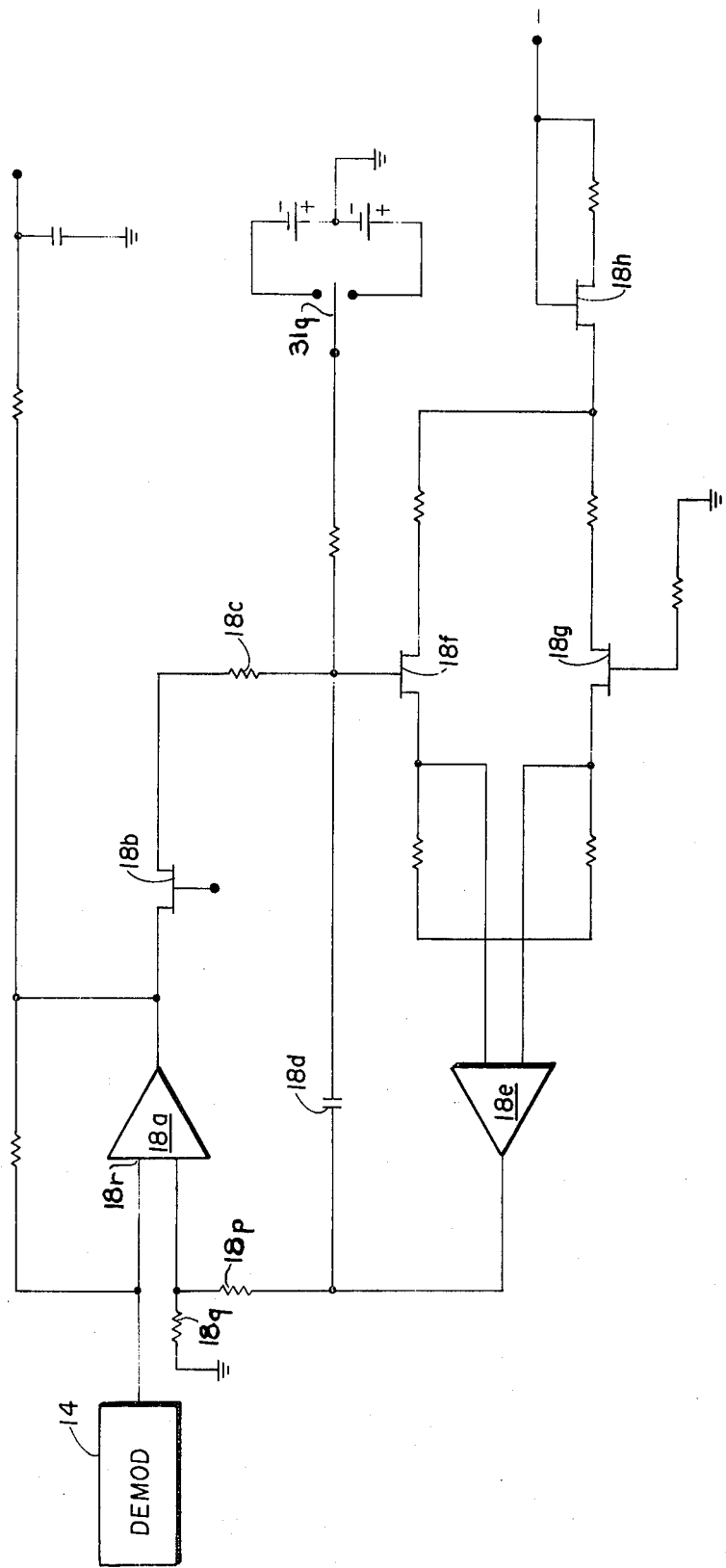
FIG. 3 is a diagram of a synchronizer unit per se taken from the system of FIG. 2.

FIG. 3 illustrates a simplified solid state synchronizer which is in all major respects present in the circuit of FIG. 2 but which does accommodate only limited rotation during synchronization. A circuit such as shown in FIG. 3 is particularly suitable for use on the roll and pitch axis of an aircraft guidance system as well as for altitude select operations. In this system, two differential amplifiers 18a and 18e are involved. The integrator responsive to the output of amplifier 18a through the gate 18b comprises the resistor 18c and capacitor 18d. Capacitor 18d is connected across the differential amplifier 18e. The output of amplifier 18e is then connected by way of a resistor 18p to the second input of differential amplifier 18a. The latter input is also connected by way of resistor 18q to ground. The signal at the input terminal 18r is derived from demodulator 14 of the type shown in FIG. 2 so that a variable phase demodulated signal applied to amplifier 18a is tracked by the integrator including capacitor 18d. This continues so long as the switch 18b is conductive and so long as the relative rotation of the reference system does not exceed the linear range of the phase demodulator.

When switch 18b is rendered nonconductive, the reference point for the operation of the system is established on capacitor 18d, the latter voltage being applied to the second input of amplifier 18a.

In order to beep the system, i.e., to change the charge on condenser 18b, a switch 31q is rendered conductive to add or remove charge from condenser 18d, thereby changing the reference voltage.

Thus, the system is a solid state system highly reliable and inexpensive to construct. It performs all of the operations required of a synchronizer in the case of FIG. 2 where there is unlimited rotation during synchronization or in the case of FIG. 3 where limited rotation is to be accommodated. In the former case, the reset action in FIG. 2 is employed. In the latter case, no reset action takes place but only limited range is accommodated.

In one embodiment of the system, the amplifiers 100, 18a, 18e, 33a, 33b, 20a and 11f are all of type 741, manufactured and sold by a number of manufacturers such as Motorola, Inc. of Chicago, Illinois. The gate 15 is a junction FET of type 2N4857. Resistor 18c is 10,000 ohms. Capacitor 18d is 6 microfarads at 50 volts. Resistor 31a is 100,000 ohms. The FETs 18f and 18g are a matched pair identified as type 2N5545.

While the invention has been described primarily in connection with its use in guidance of an aircraft, it will be recognized that it can be used on any angular position device and thus is not necessarily limited to its use in autopilots or aircraft stabilization systems.

Having described the invention in connection with certain specific embodiments thereof, it is to be understood that further modifications may now suggest themselves to those skilled in the art and it is intended to cover such modifications as fall within the scope of the appended claims.

What is claimed is:

1. A synchronizer system comprising:
   a. a synchro transmitter having a gyro controlled rotor and excited from an a.c. source,
   b. a demodulator adapted momentarily to sample the output of said transmitter once every n cycles of the voltage from said a.c. source where n is greater than 1,
   c. an integrator responsive to the pulsed output of said demodulator, and
   d. a feedback network responsive to said integrator for controlling the instant of sampling said output to null said output voltage.

2. The combination set forth in claim 1 in which means are provided to latch said integrator in a given condition and simultaneously produce an error signal from the output of said integrator.

3. The combination set forth in claim 1 in which manually operable means are provided to change the condition of said integrator independent of the output of said demodulator.

4. The combination set forth in claim 1 in which $n = 2$.

5. The combination set forth in claim 1 in which means responsive to the output of said integrator automatically resets said integrator when the condition thereof exceeds predetermined limits.

6. The combination set forth in claim 1 in which said integrator comprises a capacitor to store a charge thereon proportional to the output of said demodulator and in which the sample instant for said demodulator is dependent upon the voltage across said capacitor.

7. A synchronizer for operation with a control transducer having a stator excited from a voltage source at a given frequency to produce from a rotor an output voltage at said frequency of continuously variable phase in response to continuous relative rotation between said stator and said rotor, which comprises:
   a. control means automatically responsive during a synchronization mode to a phase reference signal derived from said voltage source to sample said output voltage only at times corresponding to its zero axis crossing for relative rotation up to and exceeding 360°, and
   b. selector means operable to establish an engage mode to prevent change in the phase of sampling said output voltage.

8. The combination set out in claim 7 wherein there is provided:
   control means automatically to track the zero crossing of said output voltage as said rotor and said stator change relative positions, and
   means to latch said control means to arrest further tracking of said zero crossing and to cause development of an error signal proportional to relative movement between said rotor and said stator after latching.

9. The combination set out in claim 8 wherein said stator is mounted on an airframe, a gyro stabilizes said rotor and an autopilot actuator means for said airframe is connected at its error input to said output terminal.

10. A synchronizer to produce an error signal in response to rotation on a given axis of a sensor which comprises:
   a. a phase demodulator means responsive to said sensor to produce output signal pulses dependent upon phase variations of the demodulator input relative to a phase reference,
   b. an integrator circuit connected through a switch to the output of said demodulator,
   c. means operable at a given rate periodically to sample said demodulator to control the charge on said integrator, and
   d. means responsive to the charge on said integrator to change the phase of the instant at which said demodulator is sampled and null the output of said demodulator.

11. A solid state synchronizer to produce an error signal in response to rotation on a given axis of a sensor which comprises:
   a. means to produce an error signal from said sensor which may vary above and below a reference level depending upon the phase of the signal from said sensor,
   b. a differential amplifier having said error signal applied to one input thereof,
   c. an integrator connected at its input through a switch from the output of said differential amplifier and at its output to the second input of said differential amplifier,
   d. means selectively to open and close said switch, and
   e. an output circuit extending from the output of said differential amplifier to provide an error signal when said switch is nonconductive.

12. A synchronizer responsive to a variable phase demodulated signal which comprises:
   a. a differential amplifier connected at one input terminal to receive said demodulated signal,
   b. a second differential amplifier connected at one input to the output of said first differential amplifier by way of a switch and an integrating resistor,
   c. an integrating capacitor connected across said second differential amplifier,
   d. means to connect the output of said second differential amplifier to the second input of said first differential amplifier, and
   e. an output error signal circuit leading from said first differential amplifier to transmit an error signal when said switch is nonconductive.

13. The combination set forth in claim 12 in which manual control means are provided for selectively adding or removing charge from said capacitor independent of the output of said first differential amplifier.

14. A method synchronizing a phase reference with the rotor of a control transducer having a stator excited from a voltage source at a given frequency to produce from said rotor an output voltage at said frequency of continuously variable phase in response to continuous relative rotation between said stator and said rotor, which comprises:
   a. automatically responding during a synchronization mode to a phase reference signal derived from said voltage source to sample said output voltage only at times corresponding to its zero axis crossing for any relative rotation between said stator and rotor up to and exceeding 360°, and
   b. establishing an engage mode by preventing change in the phase of sampling said output voltage whereby said output voltage sampled at a fixed phase is representative of said relative rotation during said engage mode.

15. In a synchronizer the method of establishing a reference phase angle for producing an error signal in response to rotation on a given axis of a sensor which comprises:
   phase demodulating the output of said sensor by producing output signal pulses dependent upon phase variations of a demodulator input signal relative to a phase reference signal,
   integrating the output of said demodulator,
   periodically sampling the output of said demodulator to control a charge in said integrator, and
   in response to the charge on said integrator changing the phase of the instant at which said demodulator is sampled in direction to null the output of said demodulator.

* * * * *